United States Patent [19]

Pell

[11] 4,137,531
[45] Jan. 30, 1979

[54] RADAR SELECTIVE INTERROGATION SYSTEM

[75] Inventor: Christopher Pell, Horndean, England

[73] Assignee: Plessey Handel und Investments AG, Zug, Switzerland

[21] Appl. No.: 796,336

[22] Filed: May 12, 1977

[30] Foreign Application Priority Data

May 13, 1976 [GB] United Kingdom ............... 19697/76
Jul. 8, 1976 [GB] United Kingdom ............... 28413/76

[51] Int. Cl.² ............................................. G01S 9/56
[52] U.S. Cl. ............................................. 343/6.5 R
[58] Field of Search ....................... 343/6.5 R, 6.5 LC

[56] References Cited

U.S. PATENT DOCUMENTS

| 3,870,994 | 3/1975 | McCormick et al. | 343/6.5 R |
| 4,011,562 | 3/1977 | Bruce | 343/6.5 R |

FOREIGN PATENT DOCUMENTS 734588 8/1955 United Kingdom ................ 343/6.5 R Primary Examiner—Maynard R. Wilbur
Assistant Examiner—Richard E. Berger
Attorney, Agent, or Firm—Fleit & Jacobson

[57] ABSTRACT

An aircraft ground movement monitoring system is provided similar to that described in co-pending U.S. patent application Ser. No. 608,214, now U.S. Pat. No. 4,109,248, that makes use of an aircraft's existing SSR transponder in a hyperbolic selective interrogation technique to monitor an aircraft's position on an airfield in which, in order to overcome the problems particularly involving spurious mode C (height) interrogations that arise in long base-line systems, it is arranged that transponders that would be spuriously interrogated are interrogated first and that the required transponder is interrogated before the already interrogated transponders have finished replying.

11 Claims, 4 Drawing Figures

RADAR SELECTIVE INTERROGATION SYSTEM

This invention relates to radar systems and relates more especially to secondary surveillance radar systems.

In our co-pending U.S. patent application Ser. No. 608,214 there is disclosed an aircraft ground movement monitoring system which makes use of an aircrafts secondary surveillance radar (SSR) and also makes use of a double hyperbolic selective interrogation technique for monitoring an aircrafts position on, say, an airfield. In such systems it is usual to use a so-called mode 3A form of interrogation to determine an aircraft's identity and position but when used on airfields necessitating long base lines e.g. in excess of 1800 meters, which is the case at London's Heathrow airport, problems, particularly involving spurious mode C (height) interrogations can arise which result in a wanted reply from an aircraft being garbled. This is overcome in the invention that forms the basis of our aforesaid cognate patent application by arranging that the roles of the aerials transmitting the interrogation pulses are reversed in dependence upon which side of a line bisecting the base line an aircraft is located. In our aforementioned co-pending cognate patent application there is also mentioned a known arrangement in which use is made of a rotating directional aerial and an omnidirectional aerial for setting up the required hyperbolae and if the same technique of reversing the roles of the aerials is used in order to overcome spurious interrogations that cause garbling then it will be necessary to provide two rotating directional aerials. This would necessarily result in the system being very expensive and it is an object of the present invention to provide such a system in which the need to provide two rotating directional aerials is obviated.

According to the present invention there is provided a radar arrangement for effecting ground movement monitoring of vehicles carrying secondary surveillance radar transponders in which, in order to overcome de-garbling of a reply from a required transponder by a reply or replies from a spuriously interrogated transponder or transponders, means is provided whereby the spuriously interrogated transponder or transponders are selected first and the required transponder is selected before the spuriously selected transponder or transponders have finished replying.

In this respect it is assumed that the dead time that normally follows an actual reply is counted as part of the reply.

In carrying out the invention the transponders may be interrogated using the so-called MODE 3A form of interrogation and in one arrangement may be applied to an airfield or part thereof for effecting ground movement monitoring of aircraft in that area, the arrangement comprising a pair of spaced aerials positioned on or near the perimeter of said area, a first one of said aerials being a directional aerial the directivity of which may be changed in azimuth to scan said area and a second one of said aerials being broad beam, but preferably omni-directional, in the direction of said area.

In a preferred radar arrangement according to the invention, in order to effect the spurious interrogation of a transponder means is provided for transmitting a first interrogation pulse from the second one of the aerials and a second interrogation pulse from the first one of the aerials such that the first and second pulses set up a first hyperbola at which a first predetermined time relationship between the two pulses exists to cause any transponder located in the vicinity of said hyperbola to be interrogated and in which in order to effect interrogation of a required transponder means is provided for transmitting a third interrogation pulse from the first one of the aerials before an expected reply from a spuriously selected transponder has finished, and a fourth interrogation pulse from the second one of the aerials, the time relationship between the third and fourth pulses being such that a second hyperbola is set up at which a second predetermined time relationship between the third and fourth pulses exists for causing a required transponder in the vicinity of said second hyperbola to be interrogated.

In carrying out the invention according to the preferred arrangement means may be provided for causing successive sets of the first, second, third and fourth interrogation pulses to be transmitted to set up second hyperbolae at varying distances from the said one of the aerials, the successive sets of interrogation pulses being repeated at different azimuthal settings of the first one of the aerials, at least one receiver being provided for receiving the replies from the selected transponders.

In order to keep the coverage period for the airfield to a minimum it may be arranged that the first and second interrogation pulses are only transmitted when the second hyperbolae that are set up are more than a predetermined distance from the first one of the aerials.

In one especially envisaged arrangement three spaced receivers may be provided for receiving the replies from the selected transponders and means may be provided for determining the position of a particular reply using trilateration techniques.

Advantageously the first one of the aerials may be of the sum and difference type affording sum and difference polar diagrams and the third interrogation pulse may be transmitted from the said one of the aerials using the sum polar diagram and a fifth interrogation pulse transmitted from the said one of the aerials using the difference polar diagram, the time relationship between the third and fifth interrogation pulses being such as to cause transponders receiving them with a predetermined amplitude relationship to be suppressed.

In order to overcome problems caused by nulls in the sum radiation pattern a further omni-directional aerial may be provided from which the third interrogation pulse is additionally transmitted.

In one especially preferred radar arrangement according to the invention a master control station may be provided having associated with it a first interrogation/reception station including a directional aerial, a second interrogation/reception station including a broad beam aerial and a further reception station including a broad beam aerial.

An exemplary embodiment of the invention will now be described, reference being made to the accompanying drawings, in which, FIG. 1, depicts a radar arrangement according to the present invention as applied to the ground movement monitoring of aircraft on an airfield;

Figure 1:
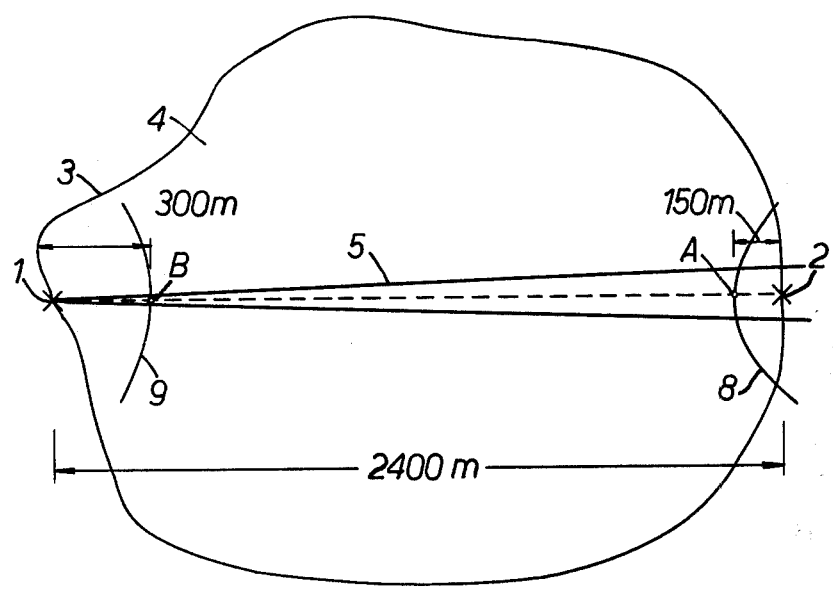

Considering the ground movement monitoring arrangement shown in FIG. 1, this consists of two spaced aerials 1 and 2 which are located on or near the perimeter 3 of an airfield 4. The aerial 1 is arranged to be a directional aerial having a relatively narrow beam radiation pattern 5 which is either mechanically or electronically movable in azimuth to enable the entire airfield 4 to be scanned. The other aerial 2 is arranged to have an omni-directional radiation pattern, the requirement being that its radiation pattern includes all parts of the airfield 4.

In order to monitor the ground movement of aircraft on the airfield 4, it is arranged that so-called $P_1$ and $P_3$ interrogation pulses are transmitted from the aerials 1 and 2 respectively having a time relationship such that so-called MODE 3A (identification) interrogation hyperbolae i.e. hyperbolae having an $8\mu s$ time relationship are set up at successive distances from the aerial 1 and at different azimuthal settings of directional aerial 1. In order to ensure that only aircraft that are located within the main beam 5 of the aerial 1 are interrogated, it may conveniently be arranged that the aerial 1 is the sum and difference type i.e. it is arranged that a sum radiation pattern that corresponds to the required directional radiation pattern is set up as shown at 6 in the aerial polar diagrams of FIG. 2 and a difference radiation pattern that is substantially omnidirectional but which has a 'notch' that corresponds to the main beam of the sum radiation pattern 6 is set up as shown at 7 in FIG. 2. In order to overcome the problems that can be caused by nulls in the sum radiation pattern 6, a further low power omnidirectional aerial (not shown) may be provided. If now the normal $P_1$ interrogation is radiated by the sum (with or without an additional omnidirectional) radiation pattern and a further $P_2$ (suppression) pulse is radiated by the difference radiation pattern, the time relationship between the $P_1$ and $P_2$ pulses being such that all aircraft receiving the $P_1$ and $P_2$ pulses with a time relationship would normally have their transponders suppressed and if use is made of the fact that for a transponder to be suppressed it is necessary for the $P_2$ pulse to be equal to or greater than the $P_1$ pulse, then by choosing the relative amplitudes of the $P_1$ and $P_2$ pulses, it may be arranged that all aircraft located outside the main beam 5 of the aerial 1 are suppressed.

However, it is found that in installations in which the base-line i.e. the distance between the aerials 1 and 2 exceeds 1800 m, as is the case at Londons Heathrow Airport, a situation can arise in which in setting up a normal MODE 3A interrogation hyperbola, if that hyperbola is 1800m or more from the directional aerial 1, then a spurious MODE C (height- $21\mu s$ pulse spacing) hyperbola is set up which would cause any aircraft located on or near that hyperbola and in the main beam 5 of the aerial 1 to be interrogated. This spurious MODE C interrogation could interfere with a valid MODE 3A interrogation causing the wanted reply to be garbled.

In the aforementioned cognate patent application it is suggested that this problem may be overcome by reversing the roles of the aerials 1 and 2 dependent upon which side of a line bisecting the baseline a mode 3A hyperbola is set up i.e. if the hyperbola is nearer aerial 1 then aerial 1 transmits the $P_1$ pulse and aerial 2 the $P_3$ pulse but if the hyperbola is nearer aerial 2 then aerial 2 transmits the $P_1$ pulse and aerial 1 the $P_2$ pulse. However, if this technique is applied to the arrangement of FIG. 1 then the aerials 1 and 2 would both need to be directional aerials. Such a system would of necessity be relatively expensive. In order to overcome the necessity of providing two directional aerials, it is proposed that in situations in which a spurious mode interrogation may take place, it is arranged that the spurious mode is purposely interrogated first, but no action taken regarding its reply and then, before the spurious mode has finished replying, the reply being deemed to include any 'dead time' that may follow any active reply, arranging that the required MODE 3A interrogation is initiated. This procedure may be better understood by considering a typical situation which will now be described with reference to the arrangement of FIG. 1.

Considering the arrangement shown in FIG. 1, let it be assumed that a $P_1$ pulse is transmitted from aerial 1 and a $P_3$ pulse is transmitted from aerial 2 such that as the aerial 1 is rotated in azimuth a hyperbola 8 is set up at which the time spacing between the two pulses is $8\mu s$ i.e. a MODE 3A interrogation command. This will cause any aircraft, such as the aircraft A that is located on or near the hyperbola 8 in the main beam 5 of the aerial 1 to respond with a MODE 3A reply. However, it is also found that a further hyperbola 9 is set up at which the time spacing between the pulses is $21\mu s$ i.e. a MODE C interrogation command, which will cause any aircraft, such as the aircraft B, that is located on or near the hyperbola 9 and in the main beam 5 of the aerial to respond with a MODE C reply. Both the MODE 3A and MODE C replies will be received contemporaneously by a receiver located, say, at the aerial 2 location causing the wanted MODE 3A reply to be garbled.

This may be overcome if, prior to the intended mode 3/A interrogation of aircraft A, a $P_1$ pulse is transmitted from aerial 2 at t = 0 and at t = $+27.0\mu s$ a $P_3$ pulse is transmitted from aerial 1, to set up the $21\mu s$ hyperbola 9 which interrogates aircraft B. No other interrogation time difference hyperbolae are generated (e.g. aircraft A sees two pulses with a time spacing of $34.0\mu s$). Hence aircraft B receives a valid mode C interrogation at time t = $+28\mu s$. It replies at a time of t = 31 ± $0.5\mu s$ and the reply sequence lasts for $20.75\mu s$, hence the trailing edge of the reply $F_2$ pulse occurs at about t = $51.8\mu s$. It is essential that the $P_1$ pulse of the intended mode 3/A interrogation is received by aircraft B prior to the termination of the reply sequence. It is preferable if, conversely, all stations that are to receive the intended mode 3/A reply from aircraft A must have received the $F_2$ bracket framing pulse of the mode C reply before receipt of the wanted reply.

If the $P_1$ pulse (from aerial 1) of the intended mode 3/A interrogation is arranged to arrive at aircraft B at t = $+47.0\mu s$ (while it is still replying), then this $P_1$ pulse must be transmitted from aerial 1 at t = $+46.0\mu s$. Therefore, this pulse is received at aircraft A at t = $+46.0 + (2250/300)\mu s = +53.5\mu s$. The accompanying $P_3$ pulse for this intended 3/A interrogation must, therefore arrive at aircraft A at t = $+61.5\mu s$, giving a time of transmission from $S_2$ of t = $+61.0\mu s$. Aircraft A receives a completed, valid mode 3/A interrogation at t = $+61.5\mu s$. Therefore, a receiver at the aerial 2 location will receive the $F_1$ reply framing pulse from this wanted 3/A interrogation at t = $+65.0 \pm 0.5\mu s$ and will have received the $F_2$ framing pulse trailing edge from the initial mode C interrogation of aircraft B at t =

+58.8μs ± 0.5μs. Therefore no garble occurs, and there is a safety time window of at least 5.2μs.

Therefore the complete interrogation pulse sequence is:

(a) at t = 0, a $P_1$ pulse is transmitted from aerial 2.

(b) at t = +27μs a $P_3$ pulse is transmitted from aerial 1.

(c) at t = +46μs a $P_1$ pulse is transmitted from aerial 1.

(d) at t = +61μs a $P_3$ pulse is transmitted from aerial 2.

From the foregoing it will be seen that as regards possible spurious effects:

1. From the initial mode C interrogation, no spurious interrogation hyperbolae can be generated, assuming that no transponder is enabled in mode D (25.0μs pulse spacing).

2. Interaction between the $P_3$ pulse of the C interrogation and the $P_1$ pulse of the 3/A interrogation, both transmitted from aerial 1, results in all aircraft over the area of coverage receiving two pulses spaced by 19μs→no spurious interrogations caused.

3. Interaction between the $P_1$ pulse of the C interrogation from aerial 2 and the $P_1$ pulse of the 3/A interrogation from aerial 1 results in no hyperbolae with pulse timing differences of less than 41μs→no spurious interrogations.

4. Interaction between the $P_3$ pulse of the C interrogation from aerial 1 and the $P_3$ pulse of the 3/A interrogation from aerial 2, results in no hyperbolae with pulse timing differences of less than 29μs→no spurious interrogations.

It will be appreciated that to repeat this procedure every time a required MODE 3A hyperbola is set up will result in the coverage period of the airfield being unnecessarily long, and the scanning time may be reduced by arranging that the sequence of four pulses as described above is only used when hyperbolae located greater than a predetermined distance e.g. 1800m from the aerial 1 are generated. It is envisaged that the interrogation technique described for effecting ground movement monitoring of aircraft and other transponder carrying vehicles on an airfield may be integrated where applicable with the usual secondary surveillance radar, with, for example, the ground movement monitoring interrogations being carried out, in the usual dead time of the secondary surveillance radar. Typically say, eight of the successive ground movement monitoring interrogations may be effected in each interval of dead time of the SSR.

Figure 2:
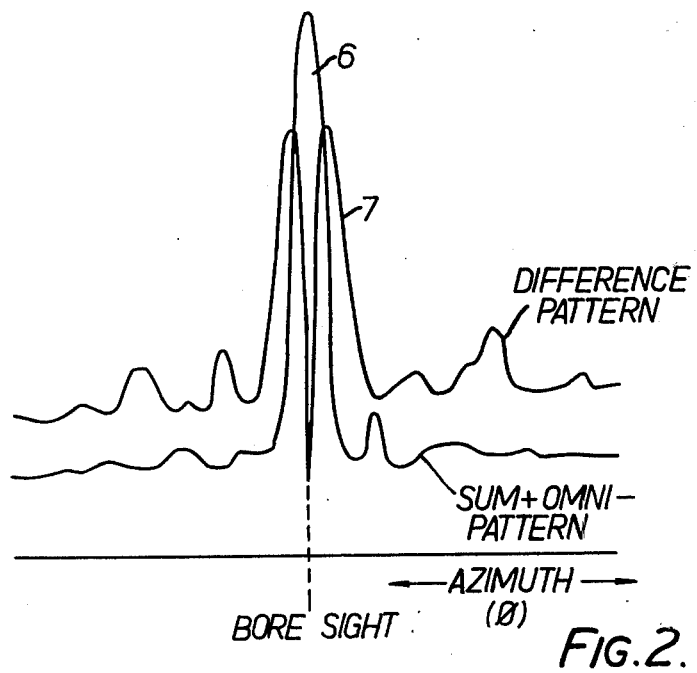
FIG. 2, depicts the sum and difference polar diagrams of an aerial suitable for use in the arrangement of FIG. 1.
Figure 3:
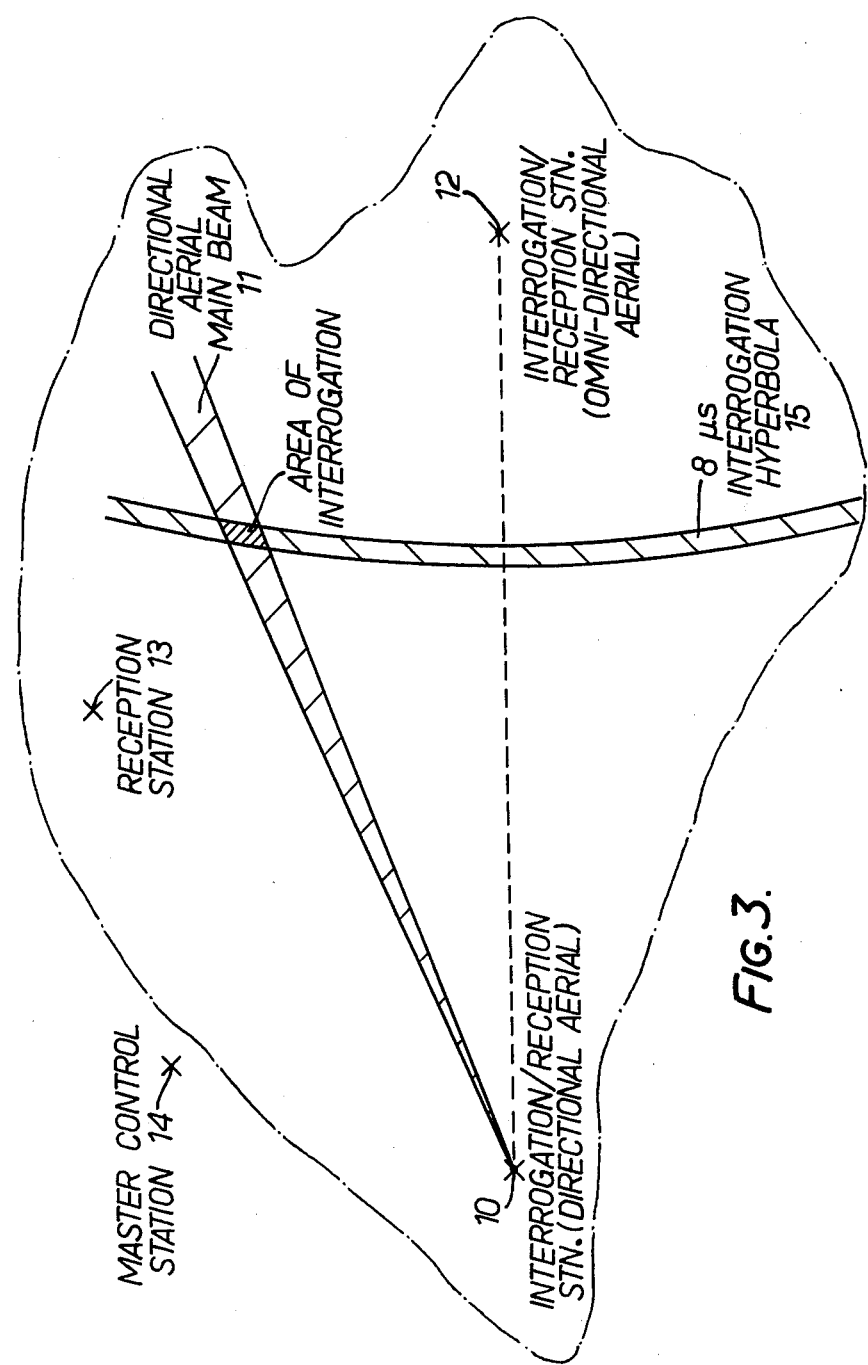
FIG. 3 depicts a typical airfield installation incorporating a radar arrangement in accordance with the present invention of the form described with reference to FIGS. 1 and 2.

In FIG. 3 of the accompanying drawings there is depicted a typical airfield installation incorporating a radar arrangement of the form already described with reference to FIGS. 1 and 2. The installation shown in FIG. 3 incorporates an interrogation/reception station 10 which includes a directional aerial for affording a main beam 11 which is rotatable in azimuth; an interrogation/reception station 12 which includes an omnidirectional aerial; and a reception station 13 which includes an omnidirectional aerial and all of which operate in conjunction with a master central station 14 which may be located at any convenient position on or off of the airfield. The interrogation/reception stations 10 and 12 are caused to operate in the manner already described with reference to FIGS. 1 and 2 to cause a series of 8μs interrogation hyperbolae, one of which is shown at 15, to be set up each of which is effectively scanned by causing the directional aerial of the interrogation/reception station 10 to be rotated in azimuth. The replies from each of the transponders thus interrogated are received by each of the three stations 10, 12 and 13 and a trilateration technique is used to determine the exact position that each transponder reply emanates from to provide an indication of the position of the transponder carrying vehicles on the airfield.

Figure 4:
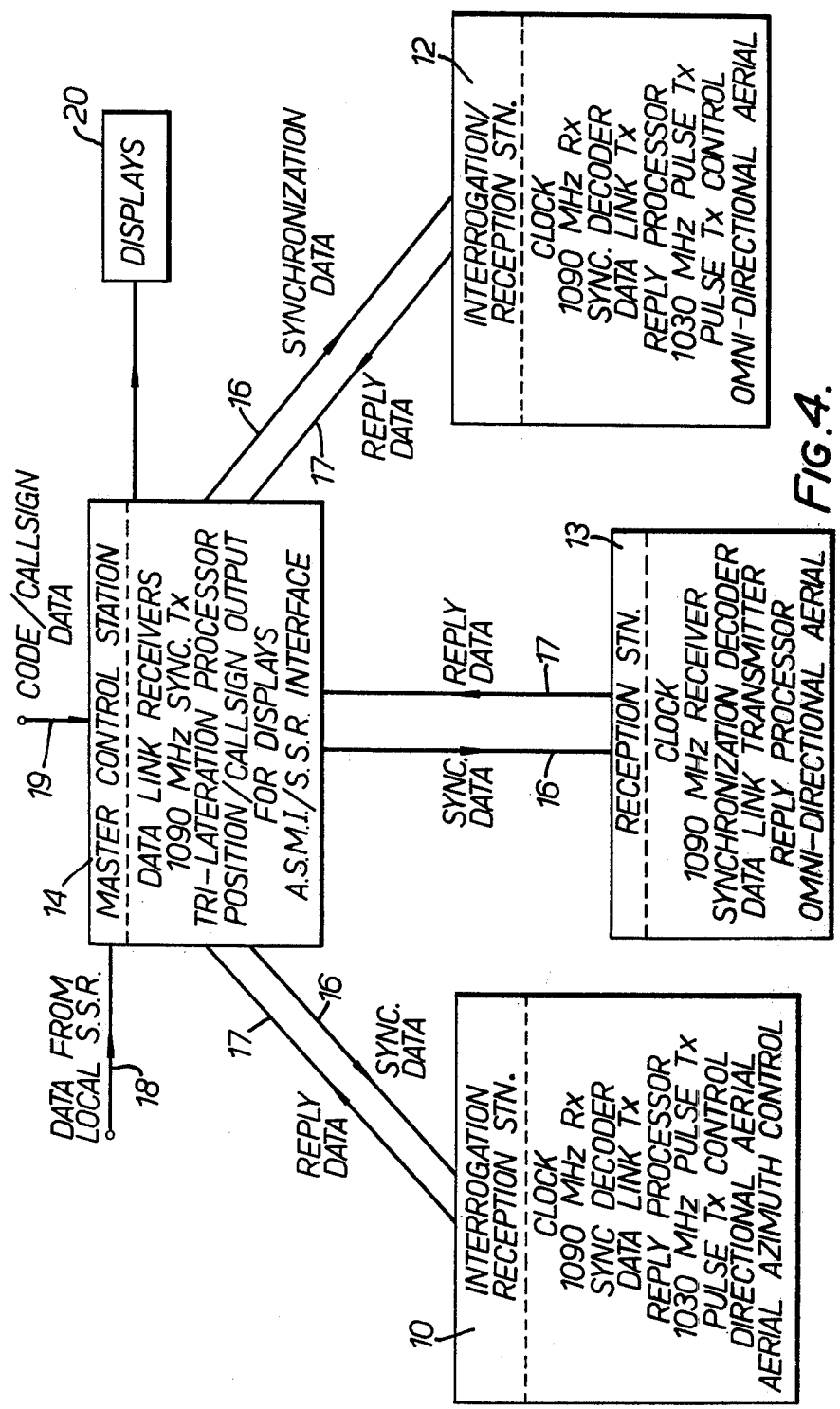
FIG. 4 is a block schematic diagram depicting the hardware incorporated in the radar arrangement of FIG. 3.

In FIG. 4 of the drawings there is shown a functional block schematic diagram of the radar arrangement depicted in FIG. 3, and shows the master control station 14 coupled to interrogation/reception stations 10 and 12 and to the reception station 13 by means of respective synchronising data links 16 and reply data links 1/. The master control station 14 is also fed from data from the local SSR via a link 18 and with code/callsign data via a link 19 and is also provided with a display or displays 20 for displaying the positional information obtained. Typically the master control station 14 may comprise a plurality of data link receivers, a 1090 MHz synchronising transmitter, a tri-lateration processor, a position/call-sign output for the displays 20 and an SSR interface. Similarly the interrogation/reception station 10 may comprise a clock, a 1090 MHz receiver, a synchronisation decoder, a data link transmitter, a reply processor, a 1030 MHz pulse transmitter, a pulse transmitter control which is preferably computer controlled, and a directional aerial with aerial azimuth control; the interrogation/reception station 12 may comprise a clock, a 1090 MHz receiver, a synchronisation decoder a datalink transmitter, a reply processor, a 1030MHz pulse transmitter, a pulse transmitter control which is preferably computer controlled and an omnidirectional aerial; and the reception station 13 may comprise a clock, a 1090MHz receiver, a synchronization decoder, a datalink transmitter, a reply processor and an omnidirectional aerial.

Although described as being applicable to MODE 3A interrogations and spurious MODE C interrogations, it will be appreciated that the technique described of eliminating garbled replies may be applied in other similar situations. As well as being applicable to the system described incorporating directional and omnidirectional aerials — conveniently referred to as a hyperbolic azimuth system — the technique may be applicable to other systems such as the double hyperbolic system that forms the basis of the aforementioned U.S. patent application Ser. No. 608,214.

What we claim is:

1. In a radar arrangement for effecting ground movement monitoring of vehicles carrying secondary surveillance radar transponders operative to provide a desired reply when interrogated by a pair of pulses having a first predetermined time separation and an interfering reply when spuriously interrogated by a pair of pulses having a second predetermined time separation, means for overcoming garbling of a desired reply by an interfering reply from a spuriously interrogated transponder comprising aerial means for transmitting a first pair of pulses timed to reach any spuriously interrogated transponder with said second predetermined time separation, and for transmitting a second pair of pulses timed to reach any transponder from which a desired reply is required with said first predetermined time separation so as to initiate interrogation thereof before any spuriously interrogated transponder becomes responsive to further interrogations.

2. A radar arrangement as claimed in claim 1, in which the transponders are interrogated using the so-called MODE 3A form of interrogation.

3. In a radar arrangement as claimed in claim 1, said aerial means comprises a pair of spaced aerials positioned on or near the perimeter of an area in which the ground movement of aircraft is to be monitored, a first one of said aerials being a directional aerial the directivity of which may be changed in azimuth to scan said area, and a second one of said aerials being broad beam in the direction of said area.

4. A radar arrangement as claimed in claim 3, in which the second one of the aerials is an omnidirectional aerial.

5. A radar arrangement as claimed in claim 3, wherein said aerial means for transmitting a first pair of pulses comprises means for transmitting a first interrogation pulse from the second one of the aerials and a second interrogation pulse from the first one of the aerials such that the first and second pulses set up a first hyperbola at which a first predetermined time relationship between the two pulses exists to cause any transponder located in the vicinity of said hyperbola to be interrogated and wherein said aerial means for transmitting a second pair of pulses comprises means for transmitting a third interrogation pulse from the first one of the aerials before an expected reply from a spuriously selected transponder has finished, and a fourth interrogation pulse from the second one of the aerials, the time relationship between the third and fourth pulses being such that a second hyperbola is set up at which a second predetermined time relationship between the third and fourth pulses exists for causing a required transponder in the vicinity of said second hyperbola to be interrogated.

6. A radar arrangement as claimed in claim 5, comprising means for causing successive sets of the first, second, third and fourth interrogation pulses to be transmitted to set up second hyperbolae at varying distances from the said one of the aerials, the successive sets of interrogation pulses being repeated at different azimuthal settings of the first one of the aerials, at least one receiver being provided for receiving the replies from the selected transponders.

7. A radar arrangement as claimed in claim 6, in which the first and second interrogation pulses are only transmitted when the second hyperbolae that are set up are more than a predetermined distance from the first one of the aerials.

8. A radar arrangement as claimed in claim 6, in which three spaced receivers are provided for receiving the replies from the selected transponders and further comprising means for determining the position of a particular reply using trilateration techniques.

9. A radar arrangement as claimed in claim 5, in which the first one of the aerials is of the sum and difference type affording sum and difference polar diagrams and in which the third interrogation pulse is transmitted from the said one of the aerials using the sum polar diagram and a fifth interrogation pulse is transmitted from the said one of the aerials using the difference polar diagram, the time relationship between the third and fifth interrogation pulses being such as to cause transponders receiving them with a predetermined amplitude relationship to be suppressed.

10. A radar arrangement as claimed in claim 9, comprising a further omnidirectional aerial from which the third interrogation pulse is additionally transmitted.

11. A radar arrangement as claimed in claim 8, comprising a master control station having associated with it a first interrogation/reception station including a directional aerial, a second interrogation/reception station including a broad beam aerial and a further reception station including a broad beam aerial.

* * * * *